(12) United States Patent
Soepriatna et al.

(10) Patent No.: US 10,605,942 B2
(45) Date of Patent: Mar. 31, 2020

(54) MULTI-ARRAY SEISMIC TOOL SYNCHRONIZATION

(71) Applicant: Schlumberger Technology Corporation, Sugar Land, TX (US)

(72) Inventors: Adrien Hendra Soepriatna, Kanagawa-ken (JP); Hideki Tanaka, Kanagawa-ken (JP); Takashi Aoki, Tokyo (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/701,732

(22) Filed: Sep. 12, 2017

(65) Prior Publication Data

US 2018/0081074 A1     Mar. 22, 2018

Related U.S. Application Data

(60) Provisional application No. 62/396,309, filed on Sep. 19, 2016.

(51) Int. Cl.
| | |
|---|---|
| G01V 1/46 | (2006.01) |
| E21B 49/00 | (2006.01) |
| G01V 1/26 | (2006.01) |
| E21B 47/12 | (2012.01) |
| G06F 1/04 | (2006.01) |
| G06F 1/12 | (2006.01) |

(52) U.S. Cl.
CPC .............. *G01V 1/46* (2013.01); *E21B 49/00* (2013.01); *G01V 1/26* (2013.01); *E21B 47/12* (2013.01); *G01V 2200/12* (2013.01); *G01V 2200/14* (2013.01); *G01V 2200/16* (2013.01); *G06F 1/04* (2013.01); *G06F 1/12* (2013.01)

(58) Field of Classification Search
CPC .. G01V 1/46; G01V 2200/12; G01V 2200/16; G01V 1/26; G01V 2200/14; E21B 49/00; E21B 47/12; G06F 1/04; G06F 1/12
See application file for complete search history.

(56) References Cited

U.S. PATENT DOCUMENTS

| | | | | |
|---|---|---|---|---|
| 4,715,047 A | * | 12/1987 | Hambley | ............ H04L 27/2332 329/310 |
| 5,612,980 A | * | 3/1997 | Ledda | ..................... H03L 7/085 327/156 |
| 7,675,816 B2 | * | 3/2010 | Mathiszik | ................ G01V 1/36 367/57 |
| 7,894,297 B2 | * | 2/2011 | Nutt | ........................ E21B 31/18 166/301 |

(Continued)

*Primary Examiner* — Franklin D Balseca

(57) ABSTRACT

A technique facilitates accumulation of information via arrays of seismic tools to enable improved assessment of subterranean reservoirs. A plurality of seismic tool arrays may be combined to increase the quantity of downhole seismic tools, e.g. sensors. The seismic tool arrays are synchronized, via downhole clock synchronization technology, in a manner which enhances seismic data collection via the combined seismic tool arrays. In drilling applications, the seismic tool arrays may be combined with a bottom hole assembly. For example, multiple seismic tool arrays may be combined in a logging-while-drilling platform.

18 Claims, 4 Drawing Sheets

High Level System Architect Diagram

(56) References Cited

U.S. PATENT DOCUMENTS

| | | | |
|---|---|---|---|
| 8,362,923 B2 * | 1/2013 | Witte | G08G 1/07 340/908 |
| 8,687,460 B2 * | 4/2014 | Coste | G01V 1/42 181/110 |
| 8,731,837 B2 * | 5/2014 | Mehta | E21B 47/00 702/106 |

* cited by examiner

High Level System Architect Diagram

Seismic Clock Synchronizer Block Diagram

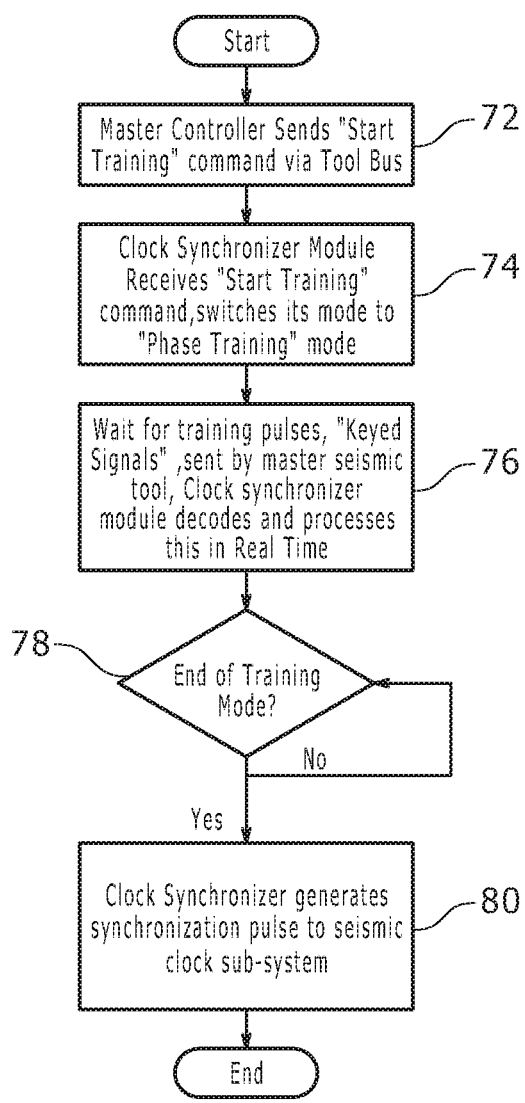
Downhole Multi-Array Seismic Synchronization Flowchart

MULTI-ARRAY SEISMIC TOOL SYNCHRONIZATION

RELATED APPLICATIONS

The present document is based on and claims priority to U.S. Provisional Application Ser. No.: 62/396,309, filed Sep. 19, 2016, entitled "MULTI-ARRAY SEISMIC TOOL SYNCHRONIZATION" to Adrien Hendra Soepriatna et al., which is incorporated herein by reference in its entirety.

BACKGROUND

Oil and natural gas production often involves the drilling of a wellbore or wellbores into a hydrocarbon bearing formation, sometimes referred to as a reservoir. Depending on the application, the drill string may incorporate various seismic tools to aid in the accumulation of knowledge regarding the surrounding hydrocarbon bearing formation. The seismic tools may comprise seismic sources to output seismic signals into the surrounding formation and also seismic sensors, e.g. geophones, to detect signals reflected back to the seismic sensors. In drilling applications, seismic logging-while-drilling applications are useful for obtaining data on the reservoir during the drilling operation.

SUMMARY

In general, a system and methodology are provided to facilitate accumulation of useful information via arrays of seismic tools. A plurality of seismic tool arrays may be combined to increase the quantity of downhole seismic tools, e.g. sensors. The seismic tool arrays are synchronized via downhole clock synchronization technology which enhances the ability to collect seismic data via the combined seismic tool arrays. In drilling applications, the seismic tool arrays may be combined with a bottom hole assembly. For example, multiple seismic tool arrays may be combined in a logging-while-drilling platform.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 5 is a flowchart illustrating an operational example for synchronization of multiple seismic arrays in a downhole environment, according to an embodiment of the disclosure.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology which enhance accumulation of seismic data. The system and methodology may be used in downhole applications and may comprise a plurality of seismic arrays which cooperate to acquire seismic data related to a subterranean reservoir or reservoirs. According to an embodiment, the seismic tool arrays may be combined to increase the quantity of downhole seismic tools, e.g. seismic sensors, and thus to increase the quantity of useful data collected. By way of example, the seismic tool arrays may be synchronized via downhole clock synchronization technology which enhances the ability to collect seismic data via the combined seismic tool arrays. In drilling applications, the seismic tool arrays may be combined with a bottom hole assembly and may be used in logging-while-drilling platforms or other downhole applications.

In a logging-while-drilling embodiment, multiple arrays of seismic downhole tools may be combined to increase the quantity of downhole seismic sensors and to improve the data collection. The arrays of seismic downhole tools may be combined in a logging-while-drilling platform using a master-slave arrangement having controller modules. Additionally, downhole clock synchronization technology may be used to synchronize the multiple arrays of seismic tools using, for example, clock synchronizer modules and reference clock modules to establish synchronized downhole clock domains. The system also may utilize acquisition modules which use the synchronized downhole clock domains to effectively provide a high data fidelity module able to collect the desired data.

Figure 1:
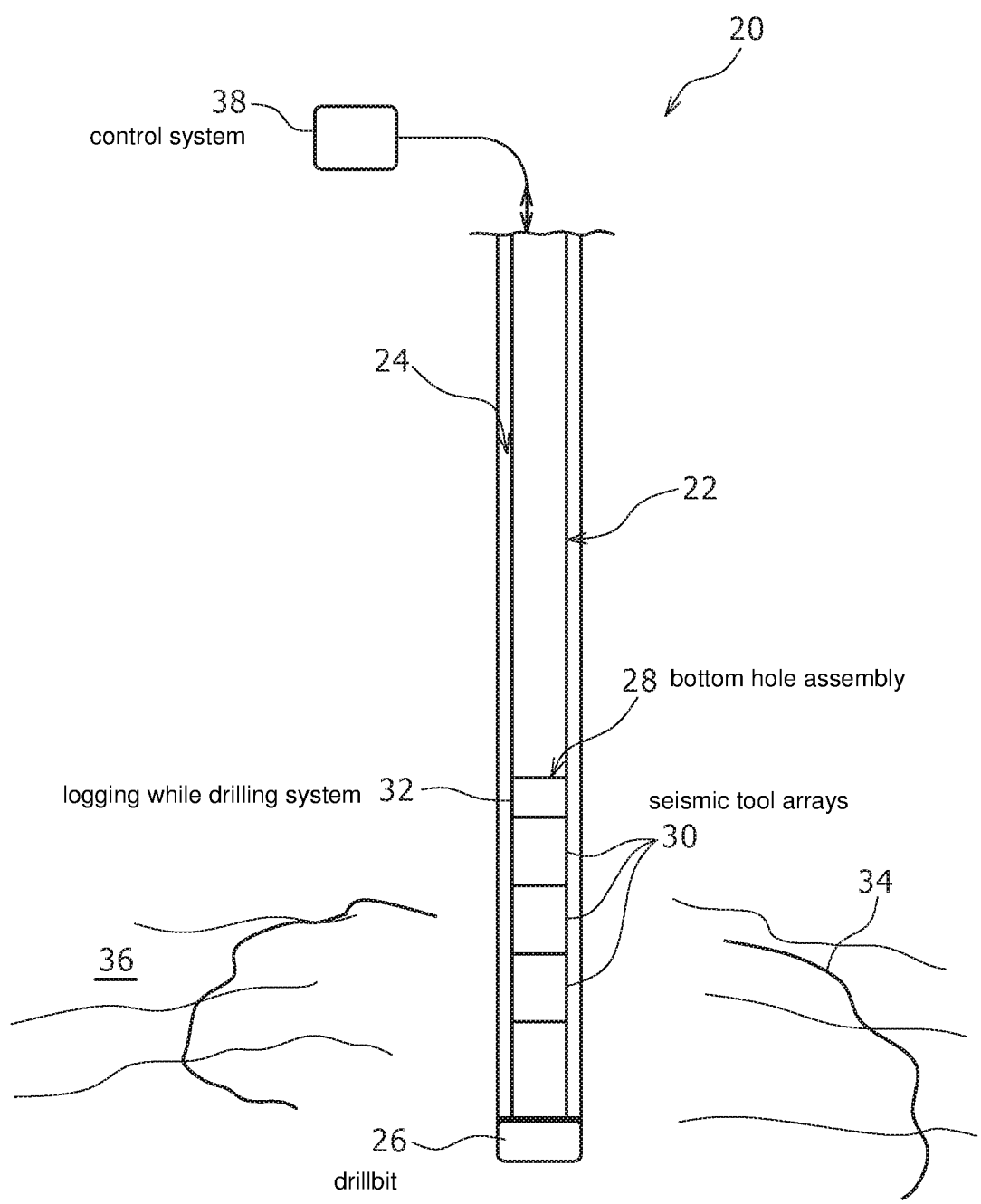
FIG. 1 is a schematic illustration of an example of a well string, e.g. a drilling string, deployed downhole in a wellbore and comprising multiple arrays of seismic tools, according to an embodiment of the disclosure.

Referring generally to FIG. 1, an example of a well system 20 is illustrated as comprising a well string 22, e.g. a drill string, disposed in a borehole 24. In a drilling application, the drill string 22 comprises a drill bit 26 which is rotated to enable drilling of the borehole 24. In this example, the drill string 22 comprises a bottom hole assembly 28 having a plurality of seismic tool arrays 30. The plurality of seismic tool arrays 30 may be used with a logging-while-drilling system 32 or another suitable data collection system. As described in greater detail below, the multiple seismic tool arrays 30 may be synchronized and used in combination to enhance data collection regarding a reservoir 34 or other features of a surrounding subterranean formation 36. In drilling applications, the drill bit 26 is rotated to drill borehole 24 and the enhanced data collection may be performed at desired stages of the drilling operation.

Synchronization of the seismic tool arrays 30 as well as collection and processing of data may be assisted by a master control system 38, e.g. a computer-based processing/control system. The control system 38 may comprise an individual processing system or a plurality of processing systems located at the surface and/or downhole. For example, some control systems 38 may be located at least partially downhole to enable localized control and/or data processing with respect to seismic tool arrays 30.

Figure 2:
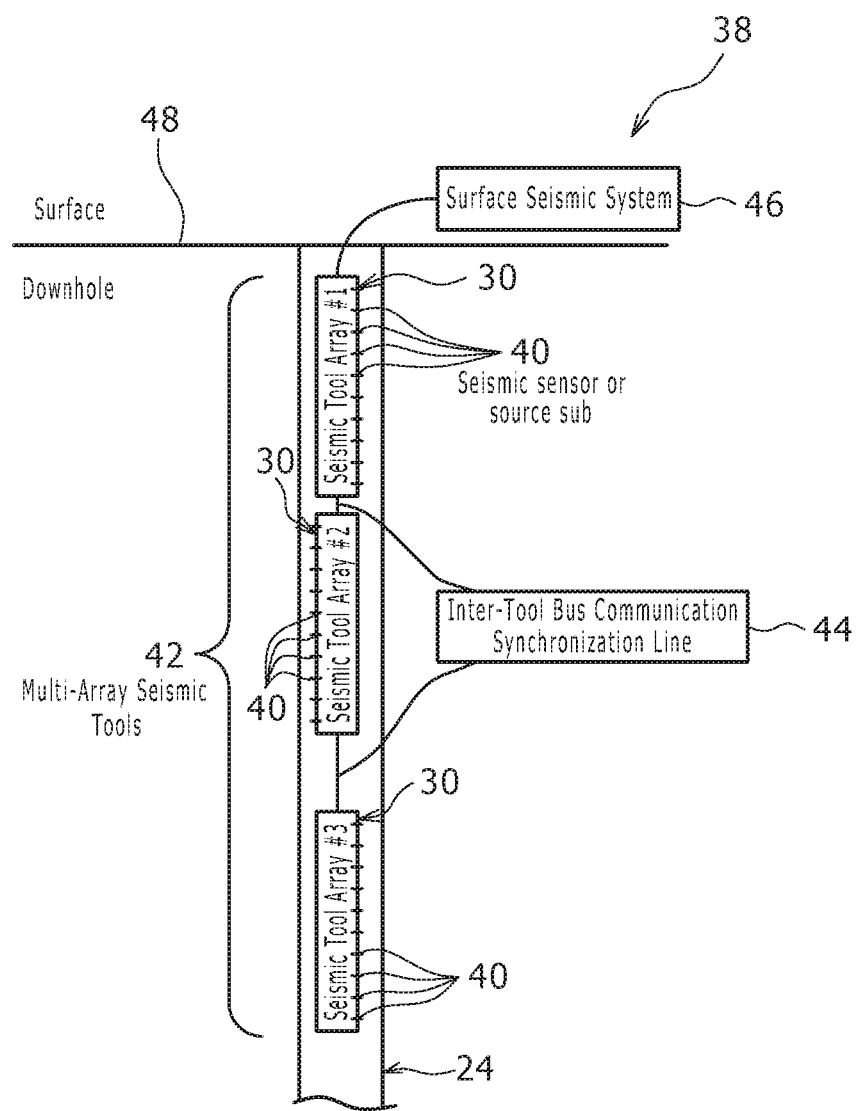
FIG. 2 is a diagrammatic illustration of an example of multiple arrays of seismic tools cooperating in a downhole application, according to an embodiment of the disclosure.

With additional reference to FIG. 2, each of the seismic tool arrays 30 may comprise a plurality of seismic tools 40, e.g. seismic sensors and/or a seismic source(s). The plurality of seismic tool arrays 30 are arranged in an overall multi-array seismic tool system 42 deployed downhole in, for example, wellbore 24. In this example, the multiple seismic tool arrays 30 may be interconnected by a suitable bus 44, such as the illustrated inter-tool bus communication synchronization line.

Data from the seismic sensors 40 of seismic tool arrays 30 may be sent to control system 38 which, in this embodiment, comprises a surface seismic system 46 located at a suitable surface location 48. The surface location 48 may be proximate or remote relative to the wellbore 24. In this example, portions of the overall master control system 38 may be located downhole to facilitate synchronization and certain data processing downhole.

Figure 3:
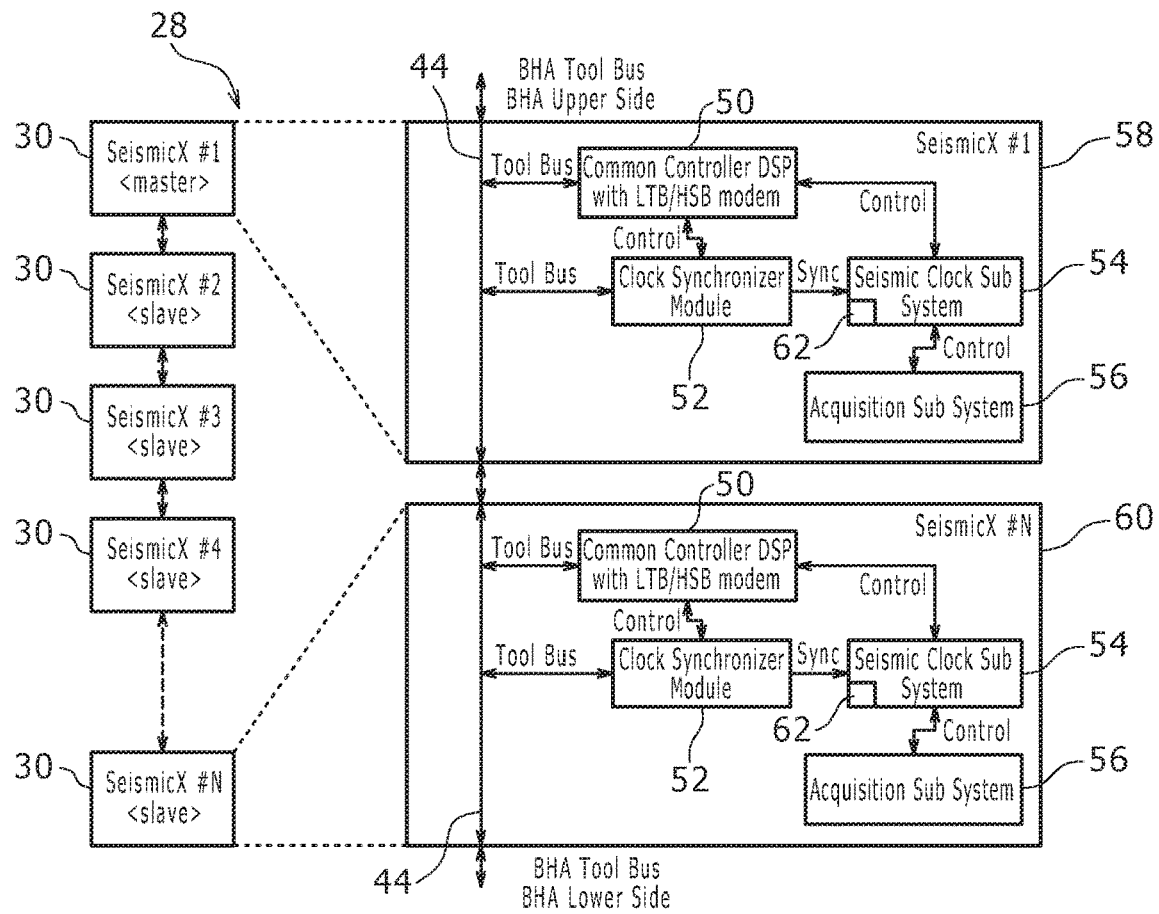
FIG. 3 is a diagrammatic illustration of an example of a high-level system architecture for multiple arrays of seismic tools located in a bottom hole assembly, according to an embodiment of the disclosure.

Referring generally to FIG. 3, for example, a high-level signal processing system is diagrammatically illustrated for use with each seismic tool array 30 disposed within bottom hole assembly 28. In this embodiment, various system controls and data processing are conducted downhole via, for example, a controller module 50. As illustrated, each controller module 50 is coupled with bus 44 and with a clock synchronizer module 52 which, in turn, is also coupled with bus 44. Both the controller module 50 and the clock synchronizer module 52 are coupled with a reference clock sub system module 54 (i.e., seismic clock sub system). Additionally, the reference clock sub system module 54 of each seismic tool array 30 is coupled with a data acquisition sub system module 56 which, in turn, may be coupled with the seismic tools 40 (see FIG. 2) to, for example, receive seismic sensor data. In some applications, the seismic tools 40 may comprise seismic sensors such as geophones.

In this example, one of the seismic tool arrays 30 of the bottom hole assembly 28 serves as the master array and the other seismic tool arrays 30 serve as slave arrays. In the example of FIG. 3, the upper illustrated seismic tool array 30 is the master array and the corresponding modules 50, 52 and sub system modules 54, 56 are combined in a master seismic processing tool 58 of the master seismic array 30. Each of the remaining seismic tool arrays 30 serves as a slave array and its corresponding modules 50, 52 and sub system modules 54, 56 are combined in a slave seismic processing tool 60.

The master seismic processing tool 58 is used to send a synchronization command or commands, via its controller module 50, to the slave seismic processing tools 60 via the standard tool bus line 44. In this example, the slave seismic processing tools 60 are each in a corresponding slave seismic tool array 30 of the bottom hole assembly 28. The tool bus line 44 may be used to carry a pilot signal from the surface seismic system 46 (see FIG. 2) and the pilot signal is understood by the controller modules 50. The pilot signal may be used to initiate or establish the master-slave communication between the seismic tool arrays 30.

Once the master-slave communication hierarchy has been established, the clock synchronizer module 52 of the master seismic processing tool 58 broadcasts an electromagnetic pulse or pulses to begin synchronization handshakes with the slave seismic processing tools 60 of the other seismic tool arrays 30 in the bottom hole assembly 28. The clock synchronizer modules 52 which receive the electromagnetic pulse(s) are configured to convert the electromagnetic pulse(s) to a very precise synchronization pulse(s). The reference clock subsystems 54 use these precise synchronization pulses to re-synchronize the internal clocks 62 of the corresponding seismic processing tools 58, 60. The internal clocks 62 are the clocks used to control the acquisition timing between each of the seismic tool arrays 30 in the bottom hole assembly 28. Consequently, the cooperating seismic processing tools 58, 60 are able to establish synchronized downhole clock domains with respect to the multiple seismic tool arrays 30.

Figure 4:
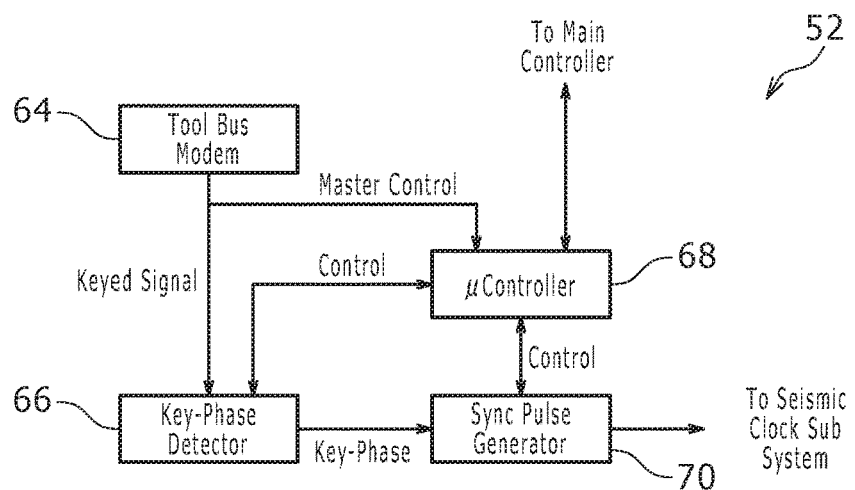
FIG. 4 is a diagrammatic illustration of an example of a reference clock synchronizer system for use in each array of seismic tools, according to an embodiment of the disclosure.

Referring generally to FIG. 4, a diagram is provided illustrating an example of a reference clock synchronizer module 52. The diagram also shows how the synchronization pulse(s) can be generated from the electromagnetic signal(s) and converted into synchronization pulse(s) ready to be consumed by the reference clock sub system 54. In the illustrated example, the reference clock synchronizer module 52 comprises a tool bus modem 64 coupled with tool bus communication line 44. The pilot signal is received by the tool bus modem 64 and is then transmitted as a keyed signal to a key-phase detector 66 and to a microcontroller 68. The key-phase detector 66 also is in communication with the microcontroller 66 via a control pathway.

The key-phase detector 66 may be coupled in communication with a synchronization pulse generator 70 of clock synchronization module 52 and thus is able to provide key-phase signals to the synchronization pulse generator 70. Furthermore, the microcontroller 68 communicates with both the synchronization pulse generator 70 and with a main controller, e.g. surface seismic system 46 (see FIG. 2). Control signals may be sent downhole from the main controller 46 to the microcontroller 68 which, in turn, provides control signals to the synchronization pulse generator 70.

Based on both the key-phase signals from the key-phase detector 66 and the control signals from microcontroller 68, the synchronization pulse generator 70 is able to output the appropriate synchronization pulses to the reference clock sub system 54 (see FIG. 3). With this synchronization data, the reference clock sub systems 54 are able to re-synchronize the internal clocks 62 thus enabling synchronization of the plurality of seismic tool arrays 30. The overall synchronization, in turn, enables an increase in the quantity and quality of data acquired by, for example, seismic sensors 40 (see FIG. 2) of the overall multi-array seismic tool system 42.

Referring generally to FIG. 5, a flowchart is provided to illustrate an example of a workflow utilizing well system 20 (see FIG. 1) and the overall seismic tool system 42 (see FIG. 2). In this operational example, the master controller, e.g. surface seismic control system 46 (see FIG. 2), sends a "start training" command via tool bus communication line 44 (see FIG. 2), as represented by block 72. The clock synchronizer modules 52 (see FIG. 3) receive the start training command which causes the clock synchronizer modules 52 to switch modes to a "phase training" mode, as represented by block 74. In the phase training mode, the slave seismic processing tools 60 (see FIG. 3) wait for training pulses sent by the master seismic processing tool 58 (see FIG. 3). The training pulses may be in the form of keyed signals.

In this example, the clock synchronizer module 52 of each slave seismic processing tool 60 operates to decode and process the keyed signals in real-time, as represented by block 76. If the training mode is not completed, the training of slave seismic processing tools 60 continues, as represented by decision block 78. However, if the training mode is completed for the seismic tool, the corresponding clock synchronizer module 52 generates a synchronization pulse to the corresponding reference clock sub system module 54 (see FIG. 3), as represented by block 80. This process may be used by the plurality of seismic processing tools 58, 60 to effectively synchronize the seismic tool arrays 30 for improved data collection and thus improved evaluation of reservoir 34 (see FIG. 1). The synchronization technique effectively establishes synchronized downhole clock domains between the plurality of seismic tool arrays 30 to enhance the acquisition of seismic data via the plurality of seismic tool arrays.

According to an operational example, a multi-array, logging-while-drilling platform is deployed downhole. The multiple seismic tool arrays use controller modules to establish a master-slave relationship between a master seismic tool array and slave seismic tool arrays of the multi-array, logging-while-drilling platform. The seismic tool arrays comprise downhole clock synchronizer modules and reference clock subsystem modules which are operated to establish synchronized downhole clock domains with respect to the multiple seismic tool arrays. The seismic tool arrays further comprise data acquisition subsystem modules which are used to acquire seismic data via the synchronized downhole clock domains. The synchronized acquisition enables accumulation of higher quantity and quality of seismic data which can be used to provide a better understanding of the surrounding reservoir/formation.

Depending on the specifics of a given drilling application or other type of application, the number and arrangement of the seismic tool arrays 30 may vary. Additionally, the type and number of seismic tools in each seismic tool array may be selected according to the parameters of a given seismic application. Similarly, the components of the seismic processing tools 58, 60 may be adjusted and may comprise various combinations of hardware and software to achieve the desired data processing and signal control. The master controller also may comprise a variety of computer-based processing systems or other types of processing systems configured, e.g. programmed, to provide the desired control signals downhole. The overall seismic tool system 42 may be combined with various while-drilling platforms, e.g. logging-while-drilling platforms or measurement-while-drilling platforms. Furthermore, the seismic data collected may be processed according to a variety of techniques to obtain desired information related to the subterranean formation.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method for enhancing seismic data collection, comprising:
    providing a drill string with a plurality of seismic tool arrays including a master seismic tool array and a plurality of slave seismic tool arrays;
    using the drill string during a drilling operation to drill a borehole in a subterranean formation;
    sending a command signal to a master seismic processing tool of the master seismic tool array;
    establishing a master-slave communication hierarchy between the master seismic tool array and the slave seismic tool arrays, the master seismic processing tool of the master seismic tool array broadcasting an electromagnetic pulse signal to seismic processing tools of the slave seismic tool arrays to initiate synchronization handshakes downhole by converting the electromagnetic pulse signal to a precise synchronization pulse signal, thus establishing synchronized downhole clock domains to facilitate acquisition of seismic data; and
    collecting seismic data at desired stages of the drilling operation via the synchronized downhole clock domains.

2. The method as recited in claim 1, wherein sending comprises sending the command signal along a tool bus communication line.

3. The method as recited in claim 1, wherein providing comprises locating the plurality of seismic tool arrays in a bottom hole assembly of the drill string.

4. The method as recited in claim 1, further comprising coupling each clock synchronization module to a corresponding controller module and to a corresponding reference clock sub system.

5. The method as recited in claim 2, further comprising coupling each clock synchronization module to the tool bus communication line via a key-phase detector.

6. The method as recited in claim 5, further comprising coupling the key-phase detector to a microcontroller and to a synchronized pulse generator.

7. The method as recited in claim 6, further comprising controlling the synchronized pulse generator via the microcontroller to output synchronization pulses.

8. The method as recited in claim 1, further comprising providing each seismic tool array with a plurality of seismic sensors.

9. A method, comprising:
    deploying a multi-array, logging-while-drilling platform downhole;
    using controller modules to conduct data processing downhole so as to establish a master-slave relationship between seismic tool arrays of the multi-array, logging-while-drilling platform;
    operating downhole clock synchronizer modules and reference clock sub system modules to establish synchronized downhole clock domains between the seismic tool arrays;
    establishing the master-slave relationship between a master seismic tool array and slave seismic tool arrays of the seismic tool arrays, a seismic processing tool of the master seismic tool array broadcasting an electromagnetic pulse signal to seismic processing tools of the slave seismic tool arrays to initiate synchronization handshakes downhole by converting the electromagnetic pulse signal to a precise synchronization pulse signal, thus establishing the synchronized downhole clock domains to facilitate acquisition of seismic data; and
    acquiring seismic data via data acquisition sub system modules using the synchronized downhole clock domains.

10. The method as recited in claim 9, wherein acquiring comprises acquiring seismic data during a drilling operation.

11. The method as recited in claim 9, wherein using comprises establishing a master seismic tool array and a plurality of slave seismic tool arrays.

12. The method as recited in claim 9, further comprising providing each seismic tool array with at least one of each; controller module, clock synchronization module, reference clock sub system module, and data acquisition sub system module.

13. The method as recited in claim 11, further comprising using a master control system to provide a command signal to a controller module of the master seismic tool array.

14. The method as recited in claim 13, further comprising locating the master control system at a surface.

15. The method as recited in claim 13, further comprising communicating between seismic tool arrays via a tool bus communication line.

16. A system, comprising:
a plurality of seismic tool arrays comprising a master seismic tool array and slave seismic tool arrays, the plurality of seismic tool arrays being communicatively coupled with each other, each seismic tool array of the plurality of seismic tool arrays comprising a plurality of seismic sensors and a seismic processing tool, each seismic processing tool comprising:
a controller module;
a clock synchronizer module communicatively coupled with the controller module;
a reference clock sub system module communicatively coupled with the controller module and the clock synchronization module; and
a seismic data acquisition sub system module coupled with the reference clock sub system module, the seismic processing tools communicating with each other to establish a master-slave communication hierarchy between the master seismic tool array and the slave seismic tool arrays, the seismic processing tool of the master seismic tool array broadcasting an electromagnetic pulse signal to the seismic processing tools of the slave seismic tool arrays to initiate synchronization handshakes downhole by converting the electromagnetic pulse signal to a precise synchronization pulse signal, thus establishing synchronized downhole clock domains to facilitate acquisition of seismic data.

17. The system as recited in claim 16, further comprising a drill string, wherein the plurality of seismic tool arrays is disposed along the drill string.

18. The system as recited in claim 17, wherein the plurality of seismic tool arrays is part of a logging-while-drilling platform.

* * * * *